United States Patent [19]

Takenaka

[11] Patent Number: 4,496,983
[45] Date of Patent: Jan. 29, 1985

[54] TRIMMING AREA CONTROL SYSTEM IN PHOTO-PRINTING

[75] Inventor: Yuji Takenaka, Minami-ashigara, Japan

[73] Assignee: Fuji Photo Film Co., Ltd., Ashigara, Japan

[21] Appl. No.: 445,176

[22] Filed: Nov. 29, 1982

[30] Foreign Application Priority Data

Dec. 10, 1981 [JP] Japan ............................ 56-198924

[51] Int. Cl.$^3$ .................. H04N 1/04; H04N 1/46; H04N 3/08
[52] U.S. Cl. ............................ 358/287; 358/77; 358/80
[58] Field of Search ............... 358/77, 76, 80, 287

[56] References Cited

U.S. PATENT DOCUMENTS

| 3,794,756 | 2/1974 | Gahn et al. | 358/77 |
| 4,163,605 | 8/1979 | Yamada | 358/77 |
| 4,307,412 | 12/1981 | Van Den Bussche | 358/27 |
| 4,364,084 | 12/1982 | Akimoto et al. | 358/76 |

Primary Examiner—Howard W. Britton
Assistant Examiner—John K. Peng
Attorney, Agent, or Firm—Wenderoth, Lind & Ponack

[57] ABSTRACT

It has heretofore been extremely difficult to adjust the trimming area of a negative film image when printing a picture by a photo-printer. This invention obviates such difficulties by effectively driving and controlling a zoom lens by picking up a negative image with a TV camera provided with a zoom lens so as to facilitate monitoring the trimming areas with a monitor TV, and combining a video signal from the TV camera which corresponds to the carrier aperture of the negative film and a reference position signal which spot-scans the negative image.

23 Claims, 11 Drawing Figures

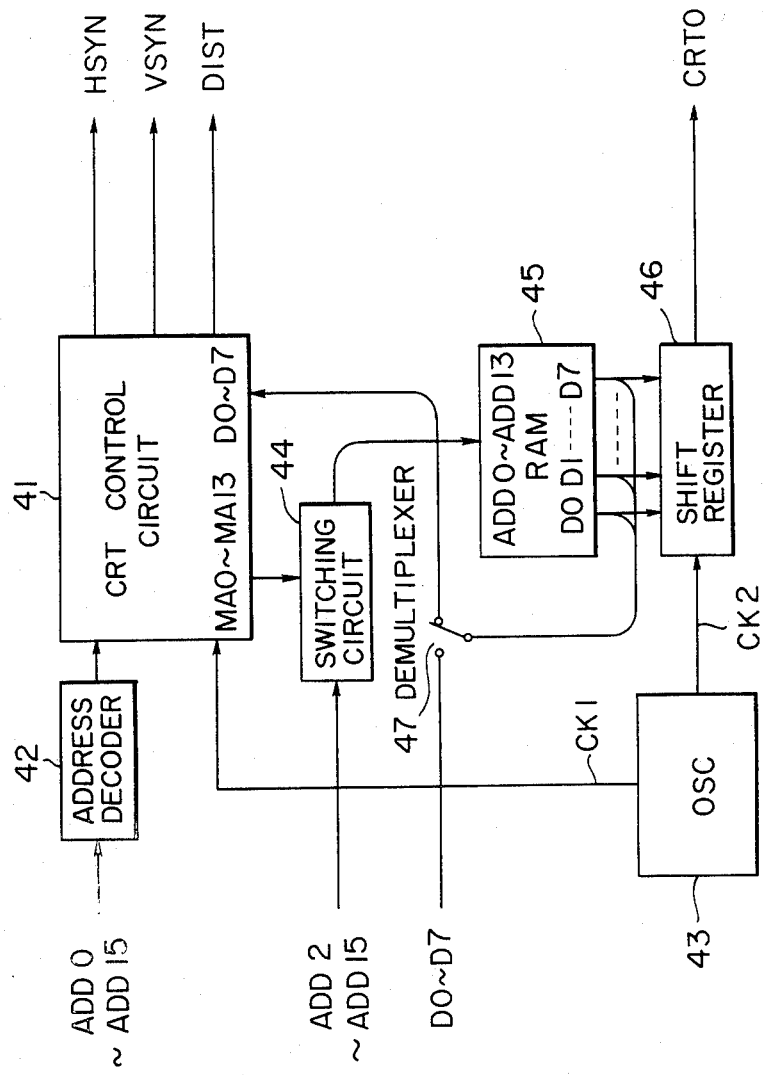
F I G. 4

TRIMMING AREA CONTROL SYSTEM IN PHOTO-PRINTING

BACKGROUND OF THE INVENTION

This invention relates to a system structured to control the trimming area in photo-printing.

Adjustment in trimming when a picture is printed by a photo-printer used to be extremely difficult in prior art. In recent years, however, the adjustment in the scope of trimming is made relatively simple by such manual methods as the one using a zoom lens or the one moving an easel and lens means. Since it is difficult to directly see an image on an easel mask in the color-printer of light-room type, the scope of trimming is determined by looking from outside an image 6 which is focused on a frosted glass 5 by reflecting a negative image 1 by a mirror 4 provided between a lens 3 and a sheet of paper 2 on the easel mask, as shown in FIG. 1A. At print-mode, as shown in FIG. 1B, the mirror 4 is removed from the optical axis and the negative image 1 is focused through the lens 3 as an image 7 on the paper 2.

The sizes of the film which are generally processed by a photo-printer vary widely from 110 size film, 135 size film, 120 size film, and brownie films (6 cm×6 cm, 6 cm×7 cm, 6 cm×9 cm) to 4×5 inch size. The same applies to the print sizes. The magnification in printing therefore greatly varies depending on the combination of those sizes. Yet in the above-mentioned method where the image 6 is focused optically on the frosted glass 5, the greater the print magnification is, the larger becomes the image, presenting a difficulty in darkening the negative image 6 focused on the frosted glass 5. It is defective further in that the negative image projected on a viewer varies in size depending on the print size as the optical system is shared by the printing system.

SUMMARY OF THE INVENTION

Accordingly, an object of this invention is to provide a control system for the trimming area in photo-printing which is capable of showing a negative image at a prescribed brightness and size irrespective of changes in print sizes and print magnifications, and which allows arbitrary determination of the trimming scopes.

Another object of this invention is to provide a photo-printing system which enable a user to print a picture at an arbitrary magnification and at an arbitrary position by displaying a trimming frame on a picture frame of a monitor TV while monitoring a negative image projected in a prescribed size thereon, and plotting the size and the position of the trimming frame upon the displayed negative image.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a block diagram showing a trimming frame forming circuit in FIG. 3 in detail;

DETAILED DESCRIPTION OF THE INVENTION

This invention will now be described in detail with reference to attached drawings.

Figure 1A:
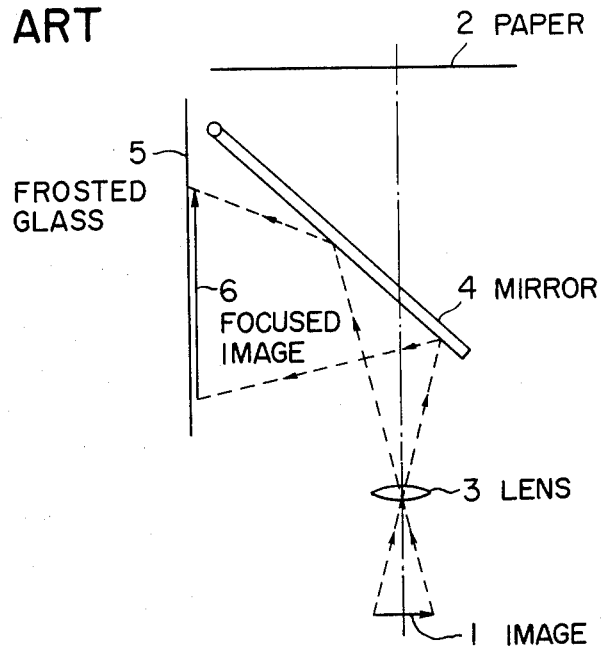
FIGS. 1A and 1B are explanatory diagrams for a description of the setting of the trimming scope in prior art.
Figure 1B:
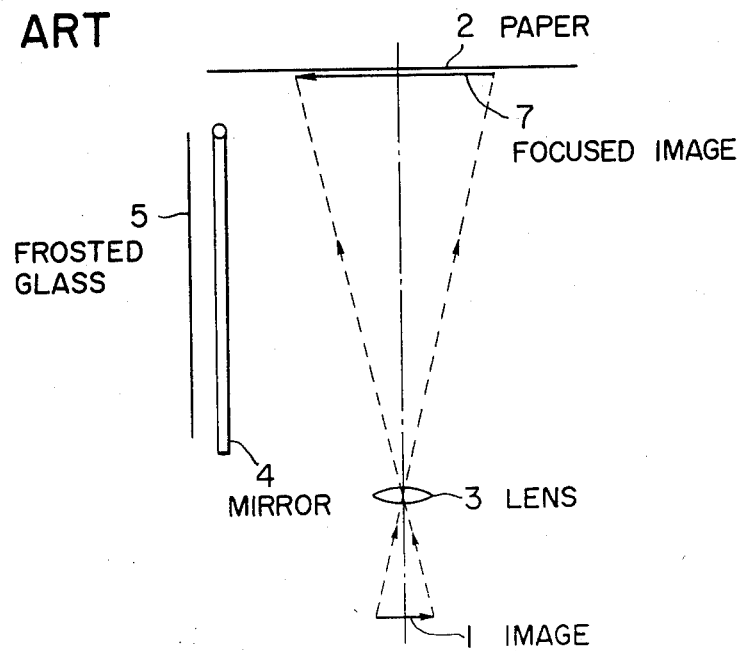
Figure 2A:
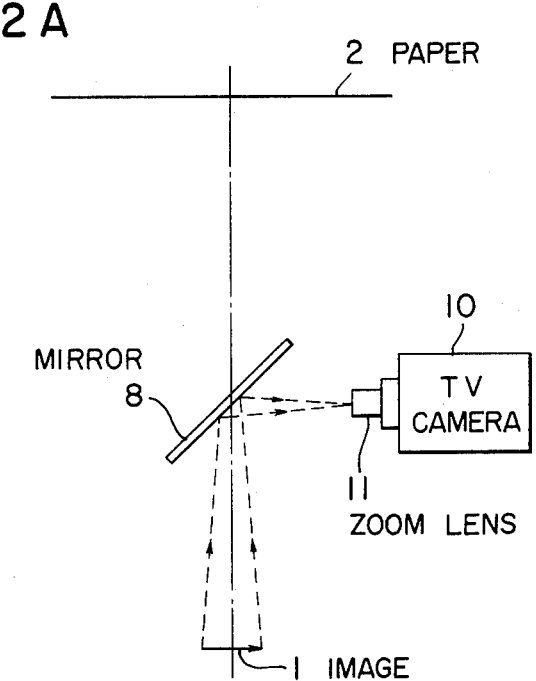
FIGS. 2A and 2B are explanatory diagrams for a description of the image input portion in this invention.
Figure 2B:
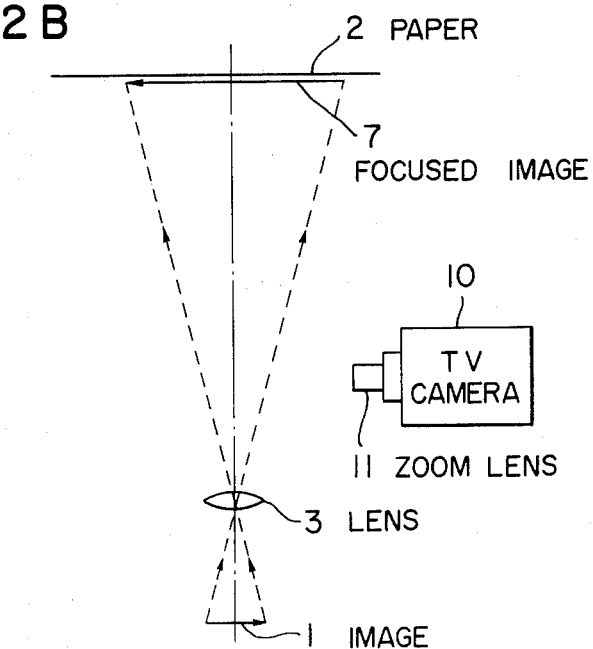
Figure 3:
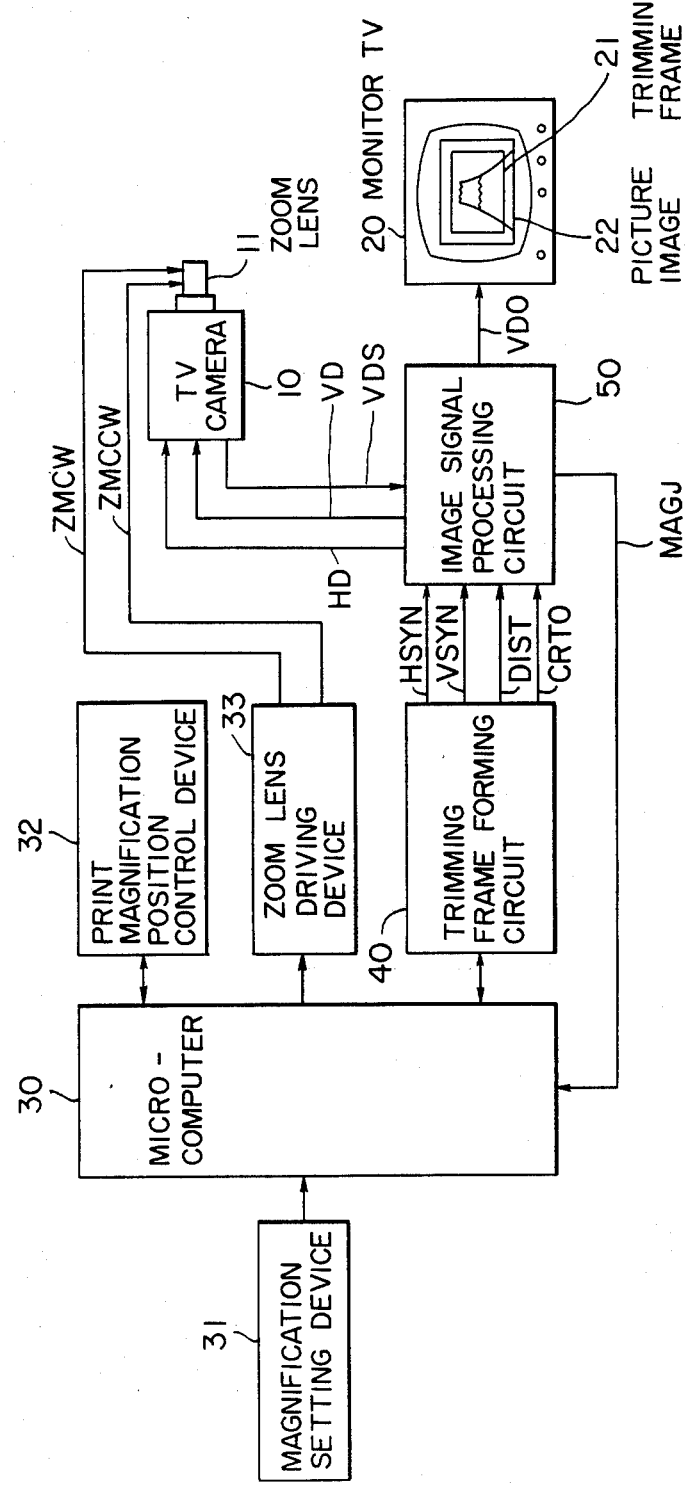
FIG. 3 is a block diagram showing an embodiment of this invention.

In a photo-printing system or a printer according to this invention which is capable of printing a picture at an arbitrary magnification wherein, as shown in FIGS. 2A, 2B and 3, an image 1 on a negative film is picked up by a TV camera 10 with a zoom lens 11 through a mirror 8 so that a scope for trimming can be observed on a monitor TV (CRT display device) 20, a video signal corresponding to the carrier aperture on the negative film from the TV camera 10 with the zoom lens 11 is combined with a position reference signal which conducts spot-scanning of the negative image picked up by the TV camera 10 in either vertical or horizontal direction, and the zoom lens 11 is driven and controlled to satisfy a prescribed value set by a position where the position reference signal coincides with the carrier aperture portion of the video signal. The printer according to the present invention is adapted to display a trimming frame which defines the trimming scope for printing on a monitor TV 20 and to vary the display size depending on the magnification of the zoom lens 11 and the printing magnification.

FIG. 2A shows a viewer-mode wherein a negative image 1 is reflected by a mirror 8 to be picked up by a TV camera 10. FIG. 2B shows a print-mode wherein the image 7 is focused on the paper 2 for printing by removing the mirror 8 out of the optical axis and inserting a lens 3 instead, and using the same TV camera 10. In this invention, the picture image 22 is focused on the monitor TV 20 in a prescribed size by changing the magnification of the viewer-mode in correspondence to the negative size or, in other words, by changing the magnification by driving and controlling the zoom lens 11. This method is extremely advantageous in determining the print magnification. When a negative image is picked up by a TV camera as this invention, the resolution thereof is determined by the display system of the TV, the performance of the TV camera and of the monitor TV and therefore usually becomes lower than the optical system type mentioned above. In order to avoid such inconveniences, the size of the picture image on the monitor TV 20 according to this invention is adapted to become substantially identical to various negative sizes in correspondence thereto so as to effectively utilize the resolution of the picture image. A zoom lens 11 is used in this invention to vary the size of the picture image on the monitor TV 20. The important matter in using a zoom lens 11 lies in how to coincide the magnification of the zoom lens 11 with the magnification corresponding to various negative sizes and how to accurately know the magnification of the zoom lens 11 or in other words, how to know the precise position on the frame of the monitor TV 20 of the vertical (or horizontal) sides of the negative picture image picked up by the TV camera 10. In the latter case, unless the magnification of the zoom lens 11 is precisely known, an accurate frame or the trimming frame 21 cannot be composed over the negative image on the monitor TV 20 even if the magnification for printing is known.

Figure 5:
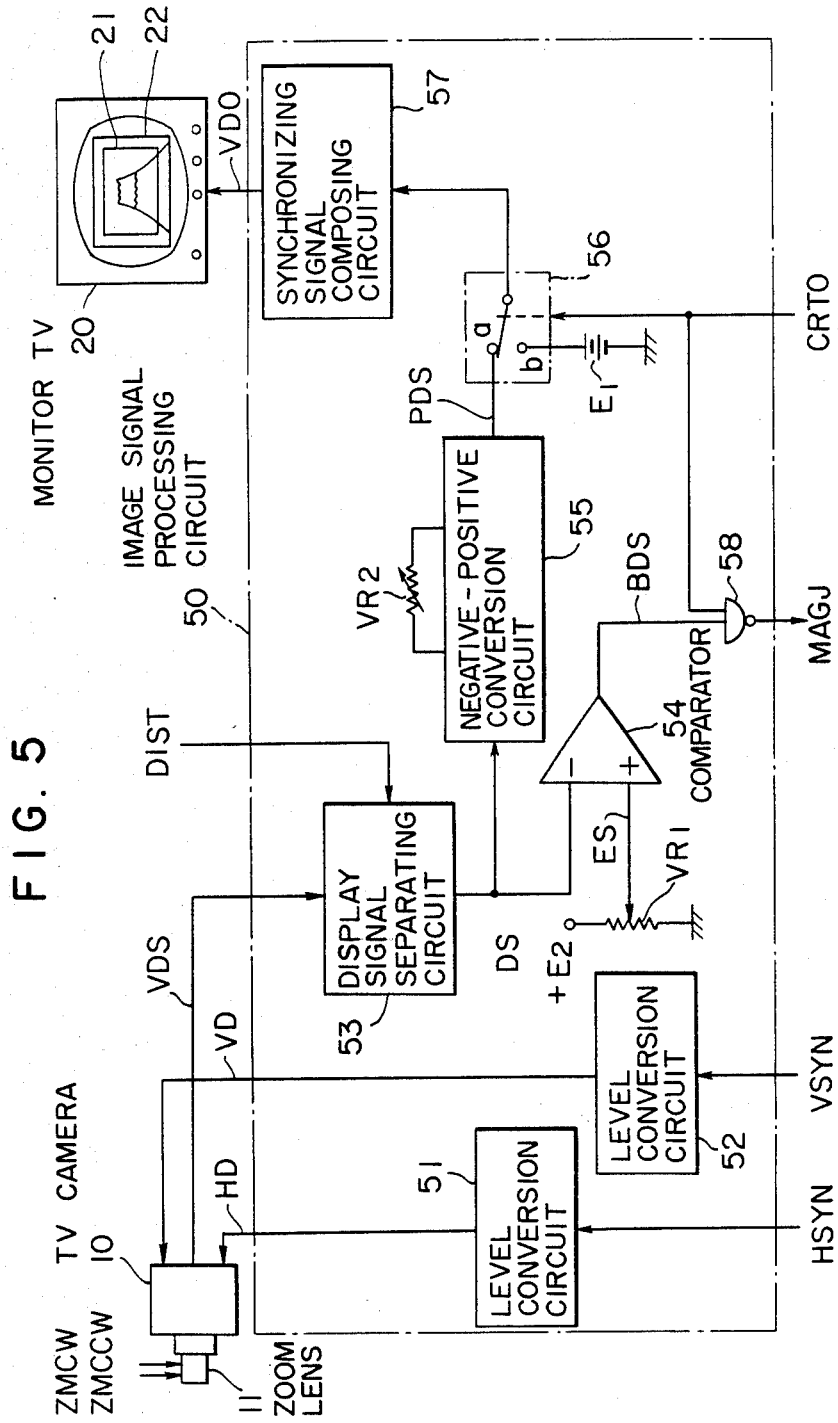
FIG. 5 is a circuit diagram, partly as a block diagram, mainly showing an image signal processing circuit in FIG. 3 in detail.

The arrangement shown in FIG. 3 is now described in detail referring to the block diagrams in FIGS. 4 and 5. A micro-computer 30 controls the whole structure of the invention as described in the foregoing. To the micro-computer 30 are connected a magnification setting device 31, a print magnification position control device 32 and a zoom lens driving device 33 as well as a trimming frame forming circuit 40 which will be shown in FIG. 4 in detail. To the latter stage of the trimming frame forming circuit 40 is connected an image signal processing circuit 50 (the details of which are shown in FIG. 5) to feed a video signal VDO with a composed trimming frame 21 to the monitor TV 20. When in use, an operator sets a magnification of the printer at print-mode on the magnification setting device 31 to adjust an easel (paper 2) and the lens 3 to the described magnification by operating the print magnification position control device 32 through the micro-computer 30. The zoom lens 11 mounted on the TV camera 10 is driven and controlled by the zoom lens driving device 33. The magnification of the zoom lens 11 is increased with the zoom lens driving signal ZMCW or decreased with the zoom lens driving signal ZMCCW.

On the other hand, FIG. 4 indicates an embodiment of the trimming frame forming circuit 40 which comprises an exclusive CRT control circuit 41 (for instance, "HD 46505S" from Hitachi, Ltd. in Japan) to display on CRT (Cathode Ray Tube) by raster scanning method, an address decoder 42 to decode address data ADD-0–ADD13 from the micro-computer 30, a clock pulse oscillator 43 to output clock pulses CK1 and CK2, a RAM (Random Access Memory) 45 to receive address data ADD0–ADD13 as well as to receive dot data D0–D7 via a demultiplexer 47 and a shift register 46 to convert parallel signal from the RAM 45 to serial signal (CRTO). A horizontal synchronizing signal HSYN transmitted from the CRT control circuit 41 is an output signal to horizontally synchronize the CRT display device (monitor TV 20), a vertical synchronizing signal VSYN is an output signal to vertically synchronize the CRT display device and a display timing signal DIST is an output signal to indicate the time period to display a picture image by horizontal and vertical scanning except for the blanking time. Memory addresses MA0–MA13 are output signals from memory address to refresh the picture image displayed on the CRT display device at a constant cycle, a cursor display signal CRTO is a trimming frame signal to display a trimming frame on the CRT display device at the time of printing which acts as a position reference signal to spot-scan at the time of setting a zoom lens magnification. Such a trimming frame forming circuit 40 may be structured by any one of well-known graphic display devices.

As shown in FIG. 5, the image signal processing circuit 50 includes level conversion circuits 51 and 52 which convert the signal level of the horizontal synchronizing signal HSYN and the vertical synchronizing signal VSYN from the trimming frame forming circuit 40 for feeding them into the TV camera 10, respectively. It also comprises a display signal separating circuit 53 to separate the display signal DS from the video signal VDS of the negative image from the TV camera 10, a comparator 54 to compare the level of a display signal DS with the reference value Es to transmit a binary display signal BDS, a negative-positive conversion circuit 55 to convert the negative display signal DS to a positive display signal and simultaneously to correct the $\gamma$-value with a variable resistor $VR_2$, a switch 56 to switch a contact by the trimming frame signal CRTO from the trimming frame signal CRTO from the trimming frame forming circuit 40, and a synchronizing signal composing circuit 57 to feed a video signal VDO composed with the trimming frame to the monitor TV 20. It is further adapted that the binary display signal BDS and the position reference signal CRTO are fed to a NAND 58, the output MAGJ therefrom is fed to the micro-computer 30. The reference value Es is fed from the variable resistor $VR_1$ and the b-contact of the switch 56 is connected to a power source $E_1$ which is equivalent to the voltage at the white level on the picture frame.

Figure 6:
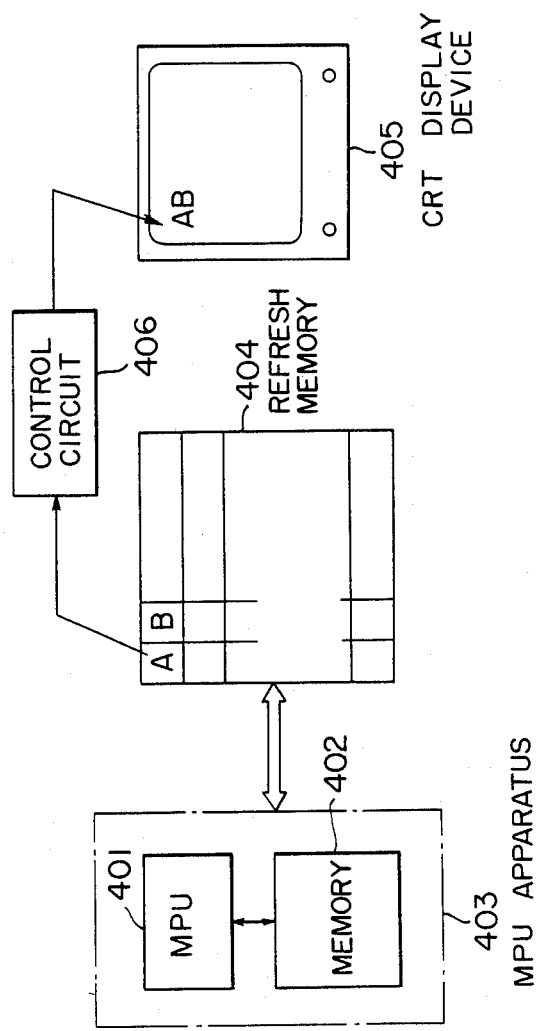
FIG. 6 is a schematic view to explain the principle of the CRT display of raster scanning type used in the invention.

In such a construction, at a viewer-mode, as shown in FIG. 2A a negative image 1 is reflected by a mirror 8, is fed to a TV camera 10 and projected as a picture image within a prescribed area 22 of the monitor TV 20. The trimming frame forming circuit 40 carries out CRT display by raster scanning method which comprises in principle, as shown in FIG. 6, an MPU apparatus 403 including an MPU (micro-Processing Unit) 401 and a memory 402, a refresh memory 404 to store data for picture image display, and a control circuit 406 to display the data of the refresh memory 404 on the CRT display device 405, thereby constantly scanning and refreshing the CRT frame so as to keep displaying characters, etc. on the picture frame of the CRT display device 405. In a CRT display device, the picture frame is usually refreshed by storing data in the memory 404 and refreshing the frame based on the stored data and the data from the MPU apparatus 403 is generally written in the memory 404. According to such a principle, in the system according to the present invention, it is adapted to write in "0" or "1" data in the RAM 45 corresponding to the rectangular trimming frame 21 to be displayed on the monitor TV 20. In other words, bits of the RAM 45 are made to respectively correspond to dots on the picture frame of the monitor TV 20 and the bits corresponding to the trimming frame alone are designated as "0" or "1". If the monitor TV 20 has a resolution of $240 \times 320$, the number of bits necessary for the RAM 45 becomes $240 \times 320 = 76,800$. In this manner the trimming frame forming circuit 40 transmits a trimming frame signal CRTO corresponding to the trimming frame data written in the RAM 45 for refreshing by the micro-computer 20. Further the CRT control circuit 41 of the trimming frame forming circuit 40 transmits a horizontal synchronizing signal VSYN and a display timing signal DIST which respectively are fed to the image signal processing circuit 50.

The image signal processing circuit 50 converts the levels of thus fed horizontal synchronizing signal HSYN and the vertical synchronizing signal VSYN by the level conversion circuits 51 and 52 and feeds them respectively to the TV camera 10. The TV camera 10 is completely synchronized with the trimming frame forming circuit 40. The video signal VDS of the negative film picked up by the TV camera 10 is fed to the display signal separating circuit 53 which separates a display signal DS alone therefrom according to the display timing signal DIST to feed it to the comparator 54 and the negative-positive conversion circuit 55. The conversion circuit 55 not only converts the negative display signal DS into a positive signal, but corrects the $\gamma$-value by the variable resistor $VR_2$. The positive display signal PDS is fed to a synchronizing signal composing circuit 57 through the switch 56 and a picture image 22 is displayed on the monitor TV 20 by the video signal VDO in correspondence to the negative image 1. The switch 56 is connected to the b-contact when the trimming frame signal CRTO is, for instance, at "1" to feed the level of the power source $E_1$, to the synchronizing signal composing circuit 57 to make the picture frame white while it is connected to the a-contact when the trimming frame signal CRTO is "0", so as to feed the positive display signal PDS into the synchronizing signal composing circuit 57 to display a picture image 22 in correspondence with the negative image. The trimming frame signal CRTO becomes "0" in accordance with the content of the RAM 45, thereby displaying the trimming frame 21 white in a size designated by the microcomputer 30 within the picture image 22 of the monitor TV 20.

Figure 7A:
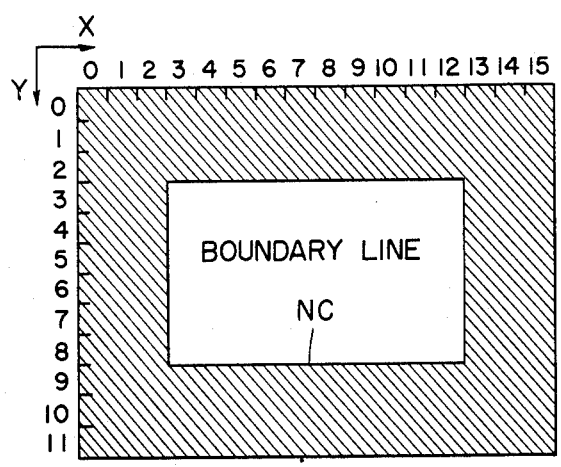
FIGS. 7A and 7B are schematic views to explain the zoom lens control according to the invention.
Figure 7B:
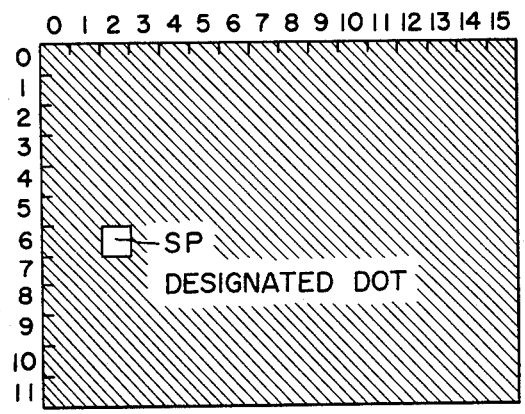

This invention is capable of producing a picture frame which is easy on eyes by making the size of the picture image 22 projected on the monitor TV 20 constant irrespective of the sizes of negative films. More particularly, it is adapted to make the size of the picture image larger by increasing the magnification of the zoom lens 11 for the negative film of a smaller size while making the size of the picture image smaller by decreasing the magnification of the zoom lens 11 for that of a larger size. The control of the zoom lens 11 will now be explained referring to FIGS. 7A and 7B. For facilitating understanding, it is assumed here that the X axis has 16 bits in resolution while the Y axis has 12 bits. As the size of the aperture of a negative carrier can be adjusted corresponding to the size of a negative film in a photoprinter, the aperture of the negative carrier is first picked up by the TV camera 10 and then the zoom lens 11 is driven to align with the position of the carrier aperture portion projected on the picture frame. By setting properly the reference value Es by adjusting the variable resistor $VR_1$, it becomes possible to extract only the part corresponding to the negative carrier aperture out of the display signal DS. If that part is displayed by making the binary output BDS from the comparator 54 to correspond with the bit of RAM 45, it will become the boundary line NC shown in FIG. 7A. The carrier aperture portion on the picture frame can then be expressed as "3"-"12" on the X axis while as "3"-"8" on the Y axis corresponding with the bits of RAM 45. If it is desired to designate the position of the carrier aperture portion on the picture frame as "3"-"12" on the X axis and "3"-"8" on the Y axis, as shown in FIG. 7B, the operator should simply output the position reference signal CRTO which has, for instance, the bit (X, Y)=(2, 6) of the RAM 45 as the designation dot SP. The binary output BDS of the comparator 54 and the trimming frame signal CRTO are fed to the NAND 58 and the AND thereof or the viewer magnification control signal MAGJ is fed to the microcomputer 30. If the carrier aperture (the white part) in FIG. 7A coincides with the designated dot SP shown in FIG. 7B, the viewer magnification control signal MAGJ periodically becomes "1" (or "0"). When the picture frame is scanned at 60 Hz, the viewer magnification control signal MAGJ becomes "1" for 60 times in one second and when they are not in coincidence, it will not become "1". By fixing the position of the designated dot SP at (X, Y)=(2, 6), and by changing the magnification of the zoom lens 11 through the zoom lens driving device 33 and by monitoring the viewer magnification control signal MAGJ, it is possible to detect the time when the end line NC of the carrier aperture starts overlapping with the position of the designated dot SP. If the driving of the zoom lens 11 is suspended at such a moment to fix the magnification, the end line NC of the carrier aperture can be suspended at the position of the designated dot SP, thereby conveniently displaying it at a given position irrespective of the sizes of negative images. The position of the designated dot SP can be adjusted arbitrarily and the magnification of the zoom lens 11 can be adjusted to meet various negatives by properly adjusting the designated dot SP. The magnification of the zoom lens 11 is always stored in the microcomputer 30.

In practice, however, it is not easy to accurately adjust the magnification due to the overrun in the motor. It is, therefore, preferable to fix the magnification of the zoom lens 11 after the operation mentioned above, and move the position of the designated dot SP, for instance, to "0"-"15" on the X axis while keeping the Y axis at "6" and then move the Y axis "0"-"11" while keeping the X axis at "8". By monitoring the change of the viewer magnification control signal MAGJ closely, the operator can easily discriminate whether the respective sidelines of the carrier aperture coincide with the addresses of the position reference signal CRTO or the trimming frame signal CRTO or not. As the lengths of the respective lines of the carrier aperture are stored in the micro-computer 30 in advance, the micro-computer 30 processes the accurate magnification of the zoom lens 11, the deviation between the carrier aperture and the optical axis of the TV camera 10, and the deviation in the synchronized timings between the trimming frame forming circuit and the TV camera to display the trimming frame in accordance therewith.

Figure 8:
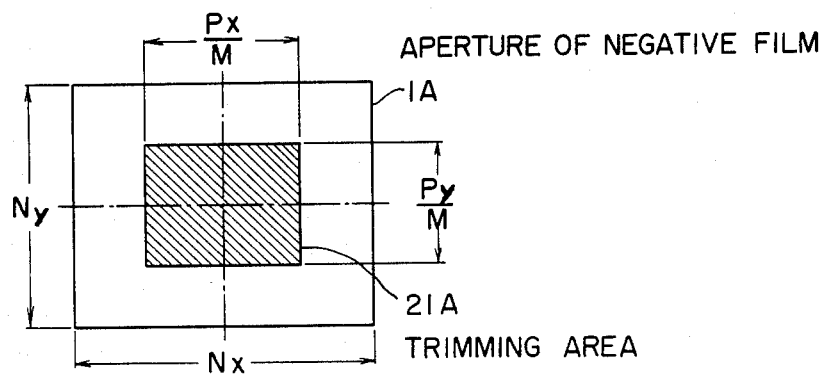
FIG. 8 is a schematic view to describe the relation between the magnification of the printer system and the trimming frame.

As described in the foregoing, the picture image of a negative film is displayed in a given size (or the size corresponding to the negative film) on the monitor TV 20. According to this invention, the trimming frame 21 is displayed within the picture image 22 on the monitor TV 20 using the magnification of the zoom lens 11 and the magnification M of the print-mode set up by the magnification setting device 31. If it is assumed that size of the aperture portion of a printing paper 2 is Px on the X axis and Py on the Y axis as shown in FIG. 2B, the trimming scope 21A will be Px/M−Py/M as against the size of the aperture 1A of the negative film of Nx−Ny as shown in FIG. 8. As the position and the size of the negative aperture on the monitor TV are stored in the micro-computer 30, the trimming frame 21 can be displayed within the picture frame 22 of the TV 20 at an arbitrary magnification based upon the aforementioned factors. For instance, by fixing the magnification of the zoom lens 11, and increasing the magnification M of the device 31, the size of the trimming frame 21 will decrease on the picture frame but by decreasing the magnification M, it will increase. The magnification in the photoprinter, therefore, can be freely adjusted by monitoring the negative image 22 and the trimming frame 21 on the monitor TV 20.

What is claimed is:

1. A trimming area control system for a photo-printer of the type capable of printing pictures at variable magnifications which is characterized in that the picture image of a negative film is picked up by a TV camera provided with a zoom lens so that the trimming scope can be monitored by a monitor TV, and that a video signal from said TV camera with the zoom lens which corresponds with aperture portion of a carrier of said negative film is combined with a position reference signal which arbitrarily scans the negative image picked up by said TV camera with the zoom lens either in vertical direction or in horizontal direction so as to drive and control the zoom lens using the position where said position reference signal coincides with the carrier aperture portion of said video signal as a designated value.

2. The trimming area control system for a photo-printer as claimed in claim 1, wherein the picture image of said negative film is picked up by said TV camera by using a mirror inserted on an optical axis for printing.

3. The trimming area control system for a photo-printer as claimed in claim 1 wherein the picture image of said negative film is displayed on said monitor TV at a given size irrespective of the sizes of the negative film.

4. A trimming area control system for a photo-printer of the type capable of printing pictures at variable magnifications which is characterized in that the picture image of a negative film is picked up by a TV camera provided with a zoom lens so that the trimming scope can be monitored by a monitor TV and a trimming frame which defines the trimming scope on photo-printing is displayed on said monitor TV, and that a video signal from said TV camera with the zoom lens which corresponds with aperture portion of a carrier of said negative film is combined with a position reference signal which arbitrarily scans the negative image picked up by said TV camera with the zoom lens either in vertical direction or in the horizontal direction so as to drive and control the zoom lens using the position where said position reference signal coincides with the carrier aperture of said video signal as a designated value, and that the size of said trimming frame can be adjusted to correspond to the magnification of the zoom lens and the print magnification.

5. The trimming area control system for a photo-printer as claimed in claim 4, wherein the picture image of said negative film is picked up by said TV camera by using a mirror inserted on an optical axis for printing.

6. The trimming area control system for a photo-printer as claimed in claim 4, wherein the picture image of said negative film is displayed on said monitor TV at a given size irrespective of the sizes of the negative film.

7. A photo-printing control system of the type capable of printing picture at variable magnifications, comprising: a camera provided with a zoom lens for picking up a picture image of a negative film; a zoom lens driving device for driving said zoom lens; a monitor TV of raster scanning method for displaying the image of the negative film picked up by said camera with the zoom lens; a trimming frame forming circuit to output a horizontal and vertical synchronizing signal for applying horizontal and vertical synchronizing on said monitor TV, respectively, a timing signal to indicate the time for displaying images by horizontal and vertical scanning except for the blanking time, a trimming frame signal for displaying a trimming frame on said monitor TV at the time of printing, and a cursor display signal which acts as the trimming frame signal to display the trimming frame on said monitor TV at the time of printing and which acts as a position reference signal to spot scan at the time of setting the magnification of said zoom lens; an image signal processing circuit which receives a video signal of the negative film from said TV camera as well as the horizontal synchronizing signal, the vertical synchronizing signal, the display timing signal and the cursor display signal and which outputs a video signal with the composed trimming frame to said monitor TV as well as a viewer magnification control signal; and a micro-computer connected to said zoom lens driving device and said trimming frame forming circuit which receives the viewer magnification control signal for controlling the whole system.

8. The photo-printing control system as claimed in claim 7, wherein said trimming frame forming circuit comprises a CRT control circuit, an address decoder for decoding the address data from said micro-computer, a clock pulse oscillator which outputs clock pulses, a RAM which receives address data through a switching circuit and which receives dot data through a demultiplexer and a shift register which converts parallel signals from the RAM into serial signals.

9. The photo-printing control system as claimed in claim 7, wherein said image signal processing circuit comprises a display signal separating circuit which separates the display signal of the negative film with the video signal from said TV camera and the display timing signal from said trimming frame forming circuit, a comparator which outputs binary display signals by comparing the level of the display signal with the reference value, a negative-positive conversion circuit which converts the negative display signal into a positive display signal and corrects the γ-value thereof, a switch which receives one of the positive display signals to switch the contact with the cursor display signal from said trimming frame forming circuit and a synchronizing signal composing circuit which outputs a video signal with a trimming frame out of the output from said switch, whereby the AND of said binary display signal and said position reference signal is used as said viewer magnification control signal.

10. The photo-printing control system as claimed in claim 9, wherein the other input of said switch is used as a voltage equivalent to the white level on the picture frame of said monitor TV.

11. The photo-printing control system as claimed in claim 7, wherein said micro-computer includes a magnification setting device to determine the magnification of the printer at the print-mode.

12. The photo-printing control system as claimed in claim 7, wherein said micro-computer includes a print magnification position control circuit, whereby an easel and lens are made to move to the set magnification.

13. A photo-printing method at variable magnification which is characterized in that an image of a negative film is picked up by a TV camera with a zoom lens so as to be able to monitor the trimming scope of the film by a monitor TV and that the zoom lens is driven in correspondence to the size of an aperture of a carrier on which the negative film is placed, thereby setting the size of display scope on said monitor TV constant and making a trimming frame displayed within the displayed picture image on said monitor TV in a size determinable by the magnifications of the zoom lens and the print-mode.

14. The photo-printing method as claimed in claim 13, wherein said trimming frame can be displayed in correspondence with the lengths of respective sides of said carrier aperture portion, the magnification of the zoom lens, the deviation in optical axis between said carrier aperture and said TV camera and the deviation in synchronizing timing between the circuit for generating the trimming frame and said TV camera.

15. The trimming area control system for a photo-printer as claimed in claim 2, wherein the picture image of said negative film is displayed on said monitor TV at a given size irrespective of the sizes of the negative film 16. The trimming area control system for a photo-printer as claimed in claim 5, wherein the picture image of said negative film is displayed on said monitor TV at a given size irrespective of the sizes of the negative film.

17. The photo-printing control system as claimed in claim 8, wherein said micro-computer includes a magnification setting device to determine the magnification of the printer at the print-mode.

18. The photo-printing control system as claimed in claim 9, wherein said micro-computer includes a magnification setting device to determine the magnification of the printer at the print-mode.

19. The photo-printing control system as claimed in claim 10, wherein said micro-computer includes a magnification setting device to determine the magnification of the printer at the print-mode.

20. The photo-printing control system as claimed in claim 8, wherein said micro-computer includes a print magnification position control circuit, whereby an easel and lens are made to move to the set magnification.

21. The photo-printing control system as claimed in claim 9, wherein said micro-computer includes a print magnification position control circuit, whereby an easel and lens are made to move to the set magnification.

22. The photo-printing control system as claimed in claim 10, wherein said micro-computer includes a print magnification position control circuit, whereby an easel and lens are made to move to the set magnification.

23. The photo-printing control system as claimed in claim 11, wherein said micro-computer includes a print magnification position control circuit, whereby an easel and lens are made to move to the set magnification.

* * * * *